April 25, 1967   P. C. BILA   3,316,033
BEARING ASSEMBLY
Filed Aug. 26, 1963   2 Sheets-Sheet 2
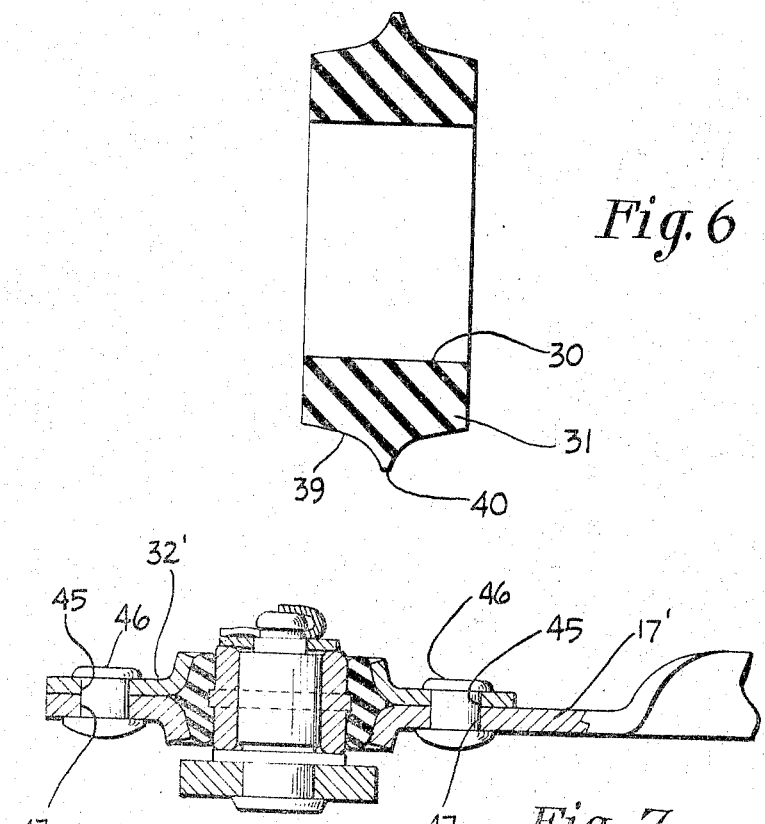
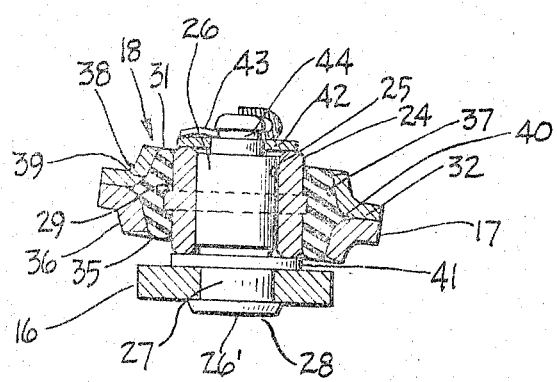
INVENTOR.
PETER C. BILA
BY E. Herbert Liss
ATTORNEY.

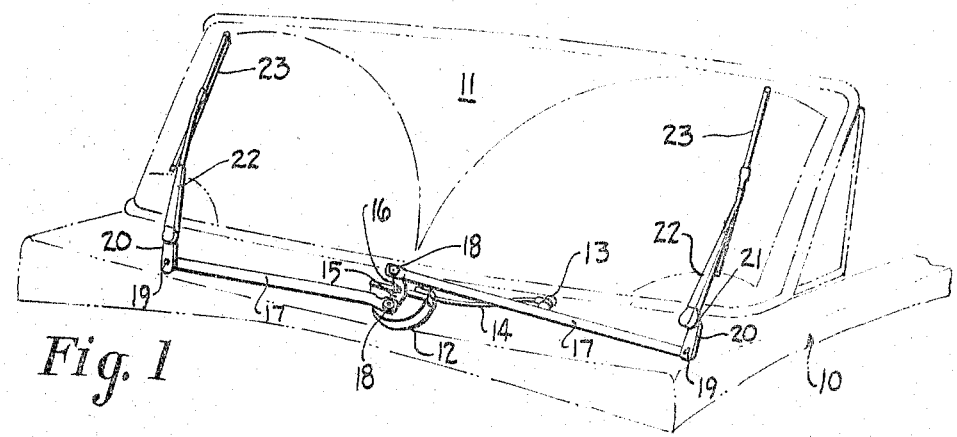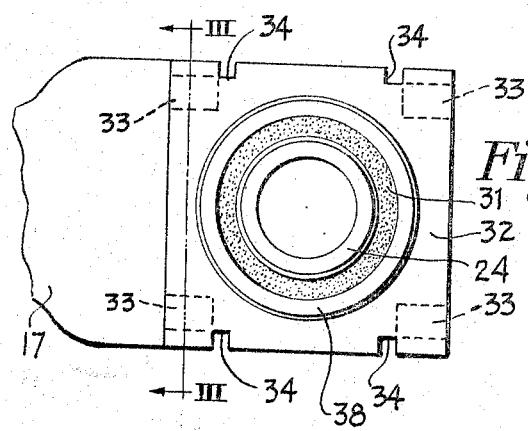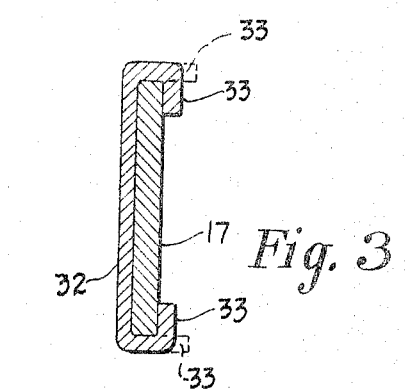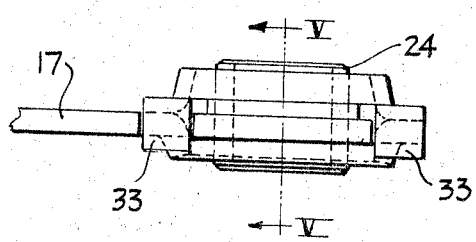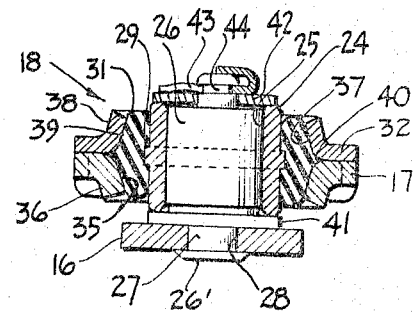

United States Patent Office 3,316,033
Patented Apr. 25, 1967

3,316,033
BEARING ASSEMBLY
Peter C. Bila, Buffalo, N.Y., assignor to Trico Products Corporation, Buffalo, N.Y.
Filed Aug. 26, 1963, Ser. No. 304,395
3 Claims. (Cl. 308—26)

The present invention relates to an improved bearing construction and more particularly to such a construction for use in a windshield wiper linkage.

In windshield wiper linkages it is necessary to transmit motion produced by the wiper motor to the wipers which oscillate across the windshield. This movement is transmitted through a series of relatively movable links which are connected to each other by bearings. In the past, two types of bearings have been used, sleeve bearings and ball joints. The sleeve bearings were incapable of permitting the required canting of certain of the links relative to each other unless they possessed a certain amount of play, such play resulting in objectionable noise, shock, and bearing wear. Ball joints on the other hand would permit canting as well as relative rotational movement between the links. However, they were relatively expensive, required a tight fit which imposed an undesirable load on the wiper motor, and because of their tight fit were subject to wear which ultimately produced looseness and noisy linkage operation. The present invention is concerned with overcoming the foregoing shortcomings by essentially providing a sleeve bearing construction which has the advantages of a ball joint without the shortcomings of the latter.

A noiseless self-aligning linkage system is provided by the present invention which permits the connecting links of the wiper system to gyrate to adjust themselves to compensate for variations in the driven lever alignment while reducing the noise and wear associated with the torque thrust produced by the gyrations. This is accomplished by the use of a bearing flexibly supported under heavy compression in a pre-stressed rubber-like mounting.

The primary object of the present invention is to provide an improved bearing construction for pivotally mounting connecting links on a shaft wherein the shaft is maintained on a longitudinally fixed axis and self-aligning movement of the links is permitted.

Another object of the present invention is to provide an improved bearing construction which transmits thrust between a linkage consisting of a shaft and a link which have both relative rotational movement and canting therebetween in a manner which is extremely silent and absorbs shocks to which the linkage is subjected.

A further object of the present invention is to provide an improved bearing construction including a mounting for permitting a bearing to adjust itself to variations in alignment between the members with which it is associated, thereby obviating binding and excessive wear of the bearing. Other objects and attendant advantages of the present invention will readily be perceived hereafter.

The improved bearing construction of the present invention is intended primarily for mounting a windshield wiper link on a shaft but it will readily be appreciated that it is equally applicable for analogous uses. The improved bearing construction includes a bearing member having an internal surface adapted to be mounted on the shaft and an external surface adapted to mount the internal surface of a resilient rubber-like bearing mounting. The external surface of the bearing mounting is engaged by retaining means on the link, said retaining means maintaining the resilient bearing mounting pre-stressed in compression between the outer surface of the bearing, on one hand, and between a surface consisting of the link and a plate, on the other hand. Basically the compressive force to which the bearing mounting is subjected by the above described structure is of a magnitude so as to permit additional compression of a first portion of the resilient bearing mounting incidental to canting movement of the links during self-alignment between the shaft and the links and to also permit an originally compressed second portion of the resilient bearing mounting to expand and fill an enlarged space resulting from said canting movement. Because of the above mentioned expansion and compression of the bearing mounting during canting, a firm engagement is maintained between the bearing and the links to thereby obviate any play which might result in shock, noise and wear when the linkage reverses its direction of movement. Furthermore, the permitting of the link to vary its orientation relative to the bearing on which it is mounted in the above described manner causes the bearing to be self-aligning without varying the position of the bearing on its longitudinal axis, to thereby obviate excessive wear which might be due to the binding experienced if the bearings were not self-aligning. Preferably there is interfitting engagement between the inside of the bearing mounting and the outside of the bearing and between the outside of the bearing and the surface of the link and the retaining plate which maintains the bearing mounting in compression. These interfitting connections enhance the firmness with which the bearing is held to thereby prevent its separation from its mounting. The present invention will be more fully understood when the following portions of the specification are read in conjunction with the accompanying drawings, wherein:

FIG. 1 is a fragmentary perspective view of an automotive vehicle mounting the improved bearing structure of the present invention;

FIG. 2 is a plan view of one form of the present invention;

FIG. 3 is a view taken substantially along line III—III of FIG. 2 and showing the manner in which the retaining member of the bearing is mounted on the link supporting the bearing;

FIG. 4 is a side elevational view of the structure of FIG. 2;

FIG. 5 is a cross sectional view taken along line V—V of FIG. 4;

FIG. 6 is a cross sectional view of the resilient bearing mounting in its normally relaxed condition;

FIG. 7 is a side elevational view of a modified embodiment of the present invention; and FIG. 8 is a cross sectional view showing the manner in which the improved bearing construction of the present invention permits both relative rotational and canting movement between a shaft and a link without excess play.

In FIG. 1 an automotive vehicle 10 is shown having a windshield 11 mounted thereon in the conventional manner. A windshield wiper motor 12 is suitably secured to the fire wall of the vehicle underneath the cowl thereof and this wiper motor may be selectively actuated in the conventional manner by the manipulation of control 13, mounted on the vehicle dashboard, which is connected to the wiper motor by Bowden wire cable 14. When the wiper motor is placed into operation, lever 15 which is mounted on motor output shaft 16 will be caused to oscillate and transmit such oscillation to elongated links 17 having first ends connected to opposite sides of lever 15 by improved bearings 18 of the present invention, the opposite ends of links 17 being pivotally connected at 19 to crankarms 20 which are mounted at the ends of rockshafts 21 journaled for pivotal movement in suitable bearings (not shown) and having wiper arms 22 mounted at the ends thereof remote from their connection with crankarms 20, said wiper arms in turn mounting wipers 23 in any suitable manner. It will be appreciated that whenever wiper motor 12 is placed in operation, wipers 23 will be caused to oscillate back and forth across the windshield to clear moisture therefrom.

One embodiment of the improved bearing construction of the present invention is shown in FIGS. 2–6. A bearing 24 is provided having an internal cylindrical surface 25 for receiving shaft or pin 26 mounted on lever 16, as by peening the head 26' thereof after its reduced neck portion 27 has been inserted through aperture 28 in said lever 16. Bearing 24, which is fabricated from porous bronze, has a substantially cylindrical outer configuration except for ridge or protuberance 29. Mounted on the external surface of bearing 24 by a force fit is the internal surface 30 of the rubber-like resilient bearing mounting 31, which is preferably fabricated from neopreme. It is to be noted that in its normal relaxed condition, that is, before installation, the internal surface 30 does not have a complementary configuration to the external surface of bearing 24. Furthermore the normal relaxed dimension of internal surface 30 of resilient bearing mounting 31 is smaller than the dimension of both the external surface of bearing 24 and ridge 29.

A retaining plate 32 is provided for placing resilient bearing mounting 31 under compression in its installed condition in FIG. 5. More specifically, retaining plate 32, FIG. 2, is essentially square and has tabs 33 formed at its four corners. Tabs 33 are crimped around the edges of links 17 at the cut away portions 34 thereof.

It is to be noted that link 17 has an aperture 35 formed therein which is bounded by flange 36. Retaining plate 32 also has an aperture 37 formed therein which is bounded by flange 38. When retaining plate 32 and link 17 are in the assembled position shown in FIG. 5, the internal surfaces 35 and 37 of flanges 36 and 38, respectively, form a concave surface. This concave surface receives the outer surface 39 of resilient bearing mounting 31 in complementary mating engagement.

The manner in which bearing 24, resilient bearing mounting 31, link 17, and retaining plate 32 are assembled is as follows: One end of resilient bearing mounting 31 is placed in aperture 35 of link 17. Thereafter plate 32 is placed on the opposite side of resilient bearing mounting 31 and tabs 33 are crimped into position. Thereafter bearing 24 is pressed into the position shown in FIG. 5 by means of a suitable pressing machine. Because of the interference fit between the external surface of bearing 24 and the internal surface 30 of resilient bearing mounting 31, resilient bearing mounting 31 will be compressed between the external surface of bearing 24 and the internal surface formed by link 17 and plate 32. The ridge 29 on the external surface of bearing 24 will distort resilient bearing mounting 31 and force its external surface 39 into firm complementary mating engagement with the internal surface formed by flanges 36 and 38 and will also cause the external protuberance 40 on resilient bearing mounting 31 to firmly fit into the concavity forming part of the surface provided by flanges 36 and 38, this concavity merely being an extension of apertures 35 and 37. Thus resilient bearing mounting 31 is in a state of compression in its normal assembled position between bearing 24, on one hand, and link 17 and retaining plate 32, on the other hand.

It is to be noted at this point that the bearing 24 is adapted to be mounted on shaft 26 affixed to link 16, as described above, in order to assemble link 17 on lever 16. This mounting is effected by merely inserting shaft 26 through bearing 24, a washer 41 being located between one end of bearing 24 and lever 16 and a washer 42 being located between the opposite end of bearing 24 and spring clip 43 which fits through groove 44 at the end of the reduced portion of shaft 26.

The foregoing bearing assembly permits relative pivotal movement between shaft 26 and link 17 and also permits relative canting movement therebetween without allowing looseness due to play as there is a change in orientation between shaft 26 and link 17. In the foregoing respect it will be appreciated that during the above described operation of the linkage which drives wiper 23, the axis of elongated link 17 cants relative to shaft 26, that is, its longitudinal axis continuously changes its orientation relative to the longitudinal axis of shaft 26 in addition to rotating about shaft 26. However, the bearing 24 remains fixed on its longitudinal axis relative to the longitudinal axis of the shaft 26. It is to be noted that resilient bearing mounting 31 is compressed only to a sufficient degree during the assembly of the bearing 18, as described in detail above, so that it will still permit further compression resulting from the above described canting, and, as the distance between certain portions of the external surface of bearing 24 and the internal concave surface formed by apertures 35 and 37 increases during said canting, certain of the originally compressed portions of resilient bearing mounting 31 will expand to fill in the increased spacing between the above mentioned members. By filling in such increased spaces, as can be seen from FIG. 8, no play is permitted between the internal surfaces formed by apertures 35 and 37 and the external surface of bearing 24. In other words, the amount of compression of resilient bearing mounting 31 is such as to permit further compression of a portion thereof due to canting while also permit another portion thereof to expand and still maintain contact with the structure on opposite sides thereof as the distance between this structure increases due to said canting. Furthermore, the amount of compression applied to bearing mounting 31 is such as to firmly retain bearing 24 therein against all of the forces tending to dislodge it therefrom and to vary its longitudinal axis relative to the longitudinal axis of shaft 26. This firm retention is further enhanced by the interfitting connection between ridge 29 and the internal surface of bearing mounting 31 and also by the interfitting connection between the external surface 39, including protuberance 40, of bearing mounting 31 and the internal surface 35 and 37 forming the apertures of link 17 and retaining plate 32, respectively.

The above described construction, in addition to providing the firm support for bearing 24, also minimizes the transmittal of shock which is otherwise experienced during reversal of linkage movement because the resilient bearing mounting 31 absorbs the shock produced incidental to changes in direction of movement of link 17 and also because the bearing mounting prevents play and looseness in the above described manner. In addition, the maintaining of the longitudinal axis of the fixed bearing 24 relative to the longitudinal axis of the shaft during movement of the link 17 from a position shown in FIG. 5 to a position shown in FIG. 8 incidental to the canting between link 17 and shaft 26 also prolongs bearing life because the bearing can maintain a position wherein it is subjected to a minimum of forces which tend to wear it out.

An alternate embodiment of the present invention is shown in FIG. 7. All of the elements bearing numerals identical to the numerals discussed above with respect to FIGS. 2–6 represent identical elements of structure and therefore in the interest of brevity will not be described again. The structure of FIG. 7 differs from the structure of the other embodiment only in the manner in which the retaining plate 32' is affixed to link 17'. In this respect retaining plate 32' has a pair of spaced apertures 45 therein which receive rivets 46 which pass through them and apertures 47 aligned therewith in link 17'. In other words, the assembly is held together by means of rivets 46 instead of tabs 33 as described above with respect to FIGS. 2–6. It is to be noted that while bearings 18 have been disclosed as being located only at opposite ends of lever 16 in FIG. 1, it will readily be appreciated that constructions like bearings 18 may be substituted for pivotal connections 19 existing between the outer ends of links 17 and crankarms 20 so that the improved bearing structure is provided at both ends of links 17.

It can thus be seen that the improved bearing construction of the present invention is manifestly capable of achieving the above enumerated functions and objects and while preferred embodiments have been disclosed, it will be fully appreciated that the present invention may be otherwise embodied.

What is claimed is:

1. A windshield wiper transmission system for transmitting the output of a wiper motor to oscillatory movement of a pair of wiper arms comprising articulated linkage including an elongated link, said elongated link having sleeve bearing means at an end thereof for journaling a stud secured adjacent an end of a wiper arm pivot shaft crankarm to permit canting and rotational movement of said elongated link, said sleeve bearing means comprising a substantially cylindrical resilient bearing mounting element, a cylindrical sleeve bearing of antifriction material frictionally retained in said bearing mounting element, an opening in said elongated link circumscribed by a first bearing retaining flange of partial spherical configuration, said bearing mounting element being seated in said first bearing retaining flange, a bearing retaining plate having an opening circumscribed by a second bearing retaining flange of partial spherical configuration, means for securing said bearing plate to said first link with said first and second bearing retaining flanges in opposition and with said resilient bearing mounting member confined in nonadhering relationship between said first and second bearing retaining flanges and with a compressive force between the external surface of said bearing and an internal surface formed by said first and second bearing retaining flanges, first retaining means on said elongated link at the junction between said link and said bearing retaining plate for engaging the external surface of said resilient bearing mounting member and second retaining means on the external surface of said cylindrical sleeve bearing for engaging the internal surface of said resilient bearing mounting member, said first and second retaining means and said first and second retaining flanges cooperating to retain said bearing means firmly mounted on said elongated link and to compress said bearing mounting element while permitting said resiliency of said bearing mounting element to permit relative canting movement between said elongated link and said cylindrical sleeve bearing element during relative rotational movement between said cylindrical sleeve bearing element and said stud, said stud being journaled in said cylindrical sleeve bearing element.

2. A windshield wiper transmission system according to claim 1 wherein said second retaining means includes an annular radially extending flange on its outer surface of said cylindrical sleeve bearing intermediate its ends for engagement with said resilient bearing mounting element.

3. A windshield wiper transmission system according to claim 2 wherein said first retaining means comprise the junction between said first and second bearing retaining flanges which forms a recess into which the resilient bearing mounting element is pressed in complementary mating engagement by said annular radially extending flange on said cylindrical sleeve bearing.

References Cited by the Examiner

UNITED STATES PATENTS

| 1,731,958 | 10/1929 | Wickstrom | 308—26 X |
| 1,964,432 | 6/1934 | Geyer | 308—26 X |
| 2,115,713 | 5/1938 | Haire | 287—85 X |
| 2,122,839 | 7/1938 | Guy | 308—26 X |
| 2,372,744 | 8/1945 | Sherman. | |
| 2,745,130 | 5/1956 | Oishei | 15—250.27 X |
| 2,976,555 | 3/1961 | Bartoo | 15—250.27 |
| 3,125,332 | 3/1964 | Peras | 287—85 X |

FOREIGN PATENTS 247,124  1/1961  Australia.

MARTIN P. SCHWADRON, *Primary Examiner.*

DAVID J. WILLIAMOWSKY, *Examiner.*

R. F. HESS, *Assistant Examiner.*